J. STROBLE.
SPEED INDICATOR.
APPLICATION FILED APR. 28, 1914.

1,132,130.

Patented Mar. 16, 1915.
2 SHEETS—SHEET 1.

Witnesses

Inventor
John Stroble
By
Attorneys

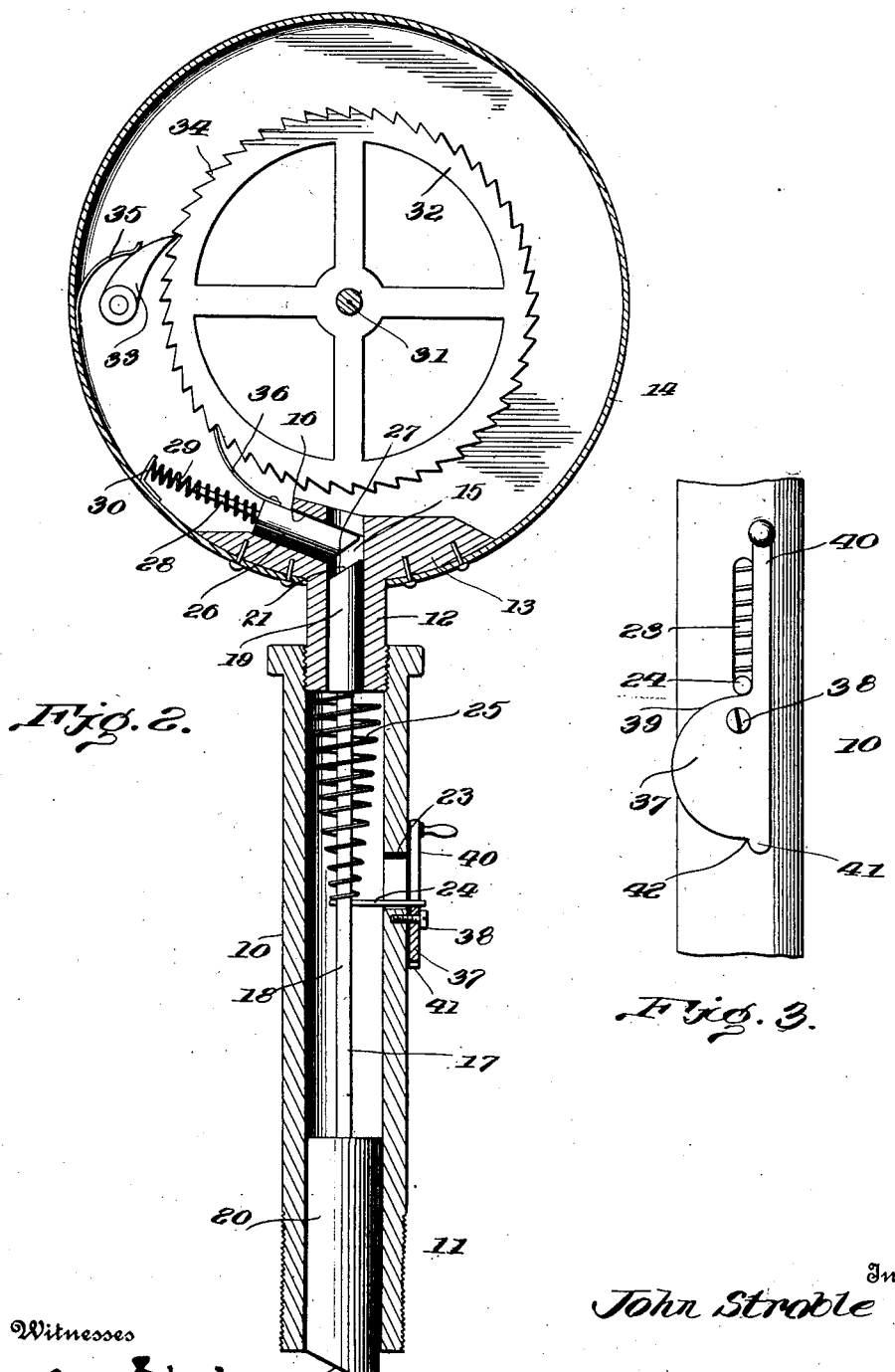

UNITED STATES PATENT OFFICE.

JOHN STROBLE, OF SEWARD, KANSAS.

SPEED-INDICATOR.

1,132,130.  Specification of Letters Patent. Patented Mar. 16, 1915.

Application filed April 28, 1914. Serial No. 835,049.

*To all whom it may concern:*

Be it known that I, JOHN STROBLE, citizen of the United States, residing at Seward, in the county of Stafford and State of Kansas, have invented certain new and useful Improvements in Speed-Indicators, of which the following is a specification.

My invention relates to new and useful improvements in speed indicators, the primary object of my invention being an indicator applicable to moving machinery of any type and so constructed that it may be employed to indicate the speed of the machine to which it is attached, the speed of the different parts of the machine to which it is attached and the speed of another machine driven by the machine to which it is attached.

A further object of my invention is to construct an indicator of the above described character, the action of which is not dependent upon swinging lever arms, meshing gears and like complicated and easily disarranged parts.

A still further object of my invention is to construct an indicator which may be readily thrown into or out of operative position, thus greatly increasing the life of the indicator as it need be employed only at such times as the speed of the machine is to be taken.

With these and other objects in view, my invention will be more fully described, illustrated in the accompanying drawings, and then specifically pointed out in the claims which are attached to and form a part of this application.

Figure 1:
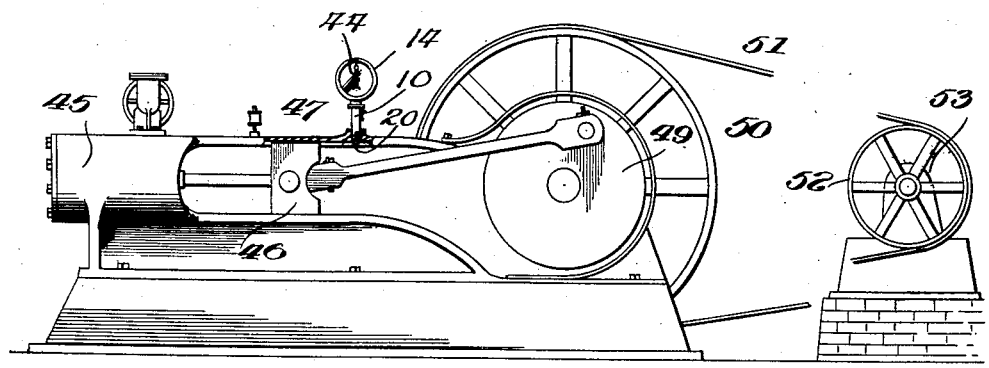
Figure 4:
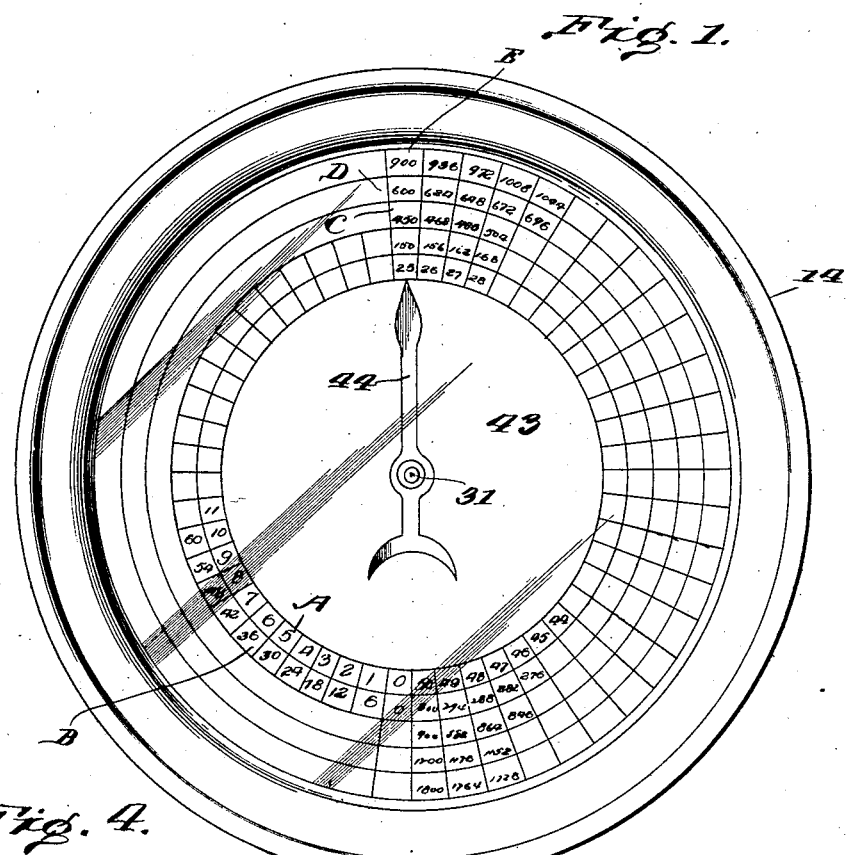

In the drawings: Figure 1 is a side elevation, partially in section, illustrating my improved indicator applied to a conventional form of steam engine; Fig. 2 is a central vertical sectional view of the indicator illustrating certain details of construction; Fig. 3 is a fragmentary elevational view, showing the means employed for throwing the indicator into and out of operative position; Fig. 4 is a front elevation of the dial employed in my indicator.

Corresponding and like parts are referred to in the following description and indicated in all the views of the drawings by the same reference characters.

In order to insure a clear understanding of my indicator it should be noted that in use the indicator is driven by a plunger which in turn is driven by any suitable reciprocating part of the machine or engine, the speed of which is to be indicated by it.

My indicator includes a tubular shank or body portion 10 screw threaded at one end as shown at 11 in order that it may be secured in the frame or other suitable part of the machine, the speed of which is to be indicated with its threaded end opening adjacent a reciprocating part of such machine or engine. The upper end of the body portion 10 is internally threaded to receive the threaded stem 12 of a bearing head 13 which carries the cylindrical casing or dial housing 14. This head with its stem 12 is provided with a vertically formed bore 15 and the head is further formed with a socket 16 extending at an angle to and communicating with the bore 15.

A plunger, indicated as a whole by the numeral 17, is mounted for reciprocation in the body portion 10 of the indicator and in the head 13, this plunger being in the form of a rod 18 provided at its upper and lower ends with cam heads 19 and 20, respectively, having oppositely inclined terminal faces 21 and 22. These cam heads are cylindrical in shape, the former being proportioned to fit snugly in the bore 15 of the bearing head 13, while the latter is proportioned to fit in like manner in the lower end of the body portion 10. The body portion 10 is provided with a vertically formed slot 23 and a pin 24 seated at one end in the rod 18 extends at its other end through the slot 23 to limit the vertical movement of the plunger and to normally support it with the cam face 22 of the lower cam head 20 extending below the lower end of the body portion 10. A helical spring 25 bears between the lower end of the bearing head 13 and this pin 24 to normally maintain the plunger in such lowered position. As shown, the cam heads are preferably provided with threaded sockets to receive the threaded terminals of the rod 18 in order that either or both of the cam heads may be readily removed and replaced by new ones in case of wear.

Referring particularly to Fig. 2 of the drawings, it will be noted that when the plunger is in normal position, the cam face 21 of the upper cam head is disposed but a slight distance below the lower end of the socket 16 which communicates with the bore 15. A co-acting cam member 26 is reciprocally mounted in the socket 16 and formed at its lower end with a cam face 27 for engagement with the cam face 21 of the cam head 19, these parts being so arranged that upon upward movement of the plunger, the cam head 19, engaging with the cam member 26, will force the latter toward the outer end of its socket 16. The opposite end of the cam member 26 is provided with a spring retaining stud 28 and a helical spring 29 surrounds this stud, bearing at one end against the cam member 26 and at the other end against a bracket 30 carried internally of the casing 14 and in axial alinement with the socket 16. A shaft 31 is journaled for rotation centrally of the casing 14 and carries a ratchet wheel 32 disposed within the casing and held against counter rotation by a pawl 33 pivotally mounted in the casing and held in constant engagement with the teeth 34 of the ratchet wheel by means of a leaf spring 35 secured to the casing and bearing by its free end against the pawl. A resilient operating finger 36 is secured to the upper end of the cam member 26 and so shaped as to engage at its free end with the teeth 34 of the ratchet wheel, whereby reciprocation of the cam member 26 will act through this finger to turn the ratchet wheel through a distance equal to the length of one of its teeth, the operating finger riding freely back over the teeth upon return movement of the cam member under the action of its spring 29, because of its resiliency, the pawl 33, in the meantime, preventing return movement of the ratchet wheel due to any frictional engagement of such wheel by the operating finger 36. It will therefore be clear that every time the cam member 20 is forced upwardly in the body member 10 of the indicator, the ratchet wheel will be turned through a distance equal to the space between adjacent teeth.

A locking cam, indicated as a whole by the numeral 37, is pivoted upon a screw or other suitable pivot pin 38 immediately below the slot 23, its cam face 39 being so formed that in one position, the cam member will lie wholly below the slot 23, while in the reverse position it will extend over the entire lower portion of the slot and will consequently hold the pin 24 in the upper end of the slot and so hold the plunger in elevated position against the action of the spring 25. This cam member is provided with an operating handle 40 by means of which it may be swung into and out of locking position and also with a stop shoulder 41 which prevents its movement past locking position, the cam face being slightly notched adjacent this shoulder as shown at 42 to hold the cam member against accidental return movement, this being accomplished through the seating of the pin 24 in the notch.

One end of the shaft 31 extends through the forward face of the casing 14 and through the dial indicated as a whole by the numeral 43 and carries an indicating needle 44 by means of which the turning of the ratchet wheel 32 is indicated. Before explaining the marking of the scales upon the dial plate, I will first explain the manner in which the indicator is mounted upon the machine or engine, the speed of which it is to show. For this purpose I have illustrated the indicator in use with a conventional form of steam engine 45 having a cross head 46 mounted for reciprocation in guides 47 and operatively connected to a fly wheel 49 carried by the same shaft which carries the drive pulley 50.

For a reason which will still later be explained, I have illustrated a belt 51 trained about the drive pulley 50 of the engine and about the pulley 52 of a pump conventionally shown at 53. The lower end of the body portion 10 of the indicator is threaded through an opening formed in one of the guide frames 47 in such a manner that such lower end extends flush with the inner or cross head engaging face of the frame so that the extended cam faced terminal of the lower cam head 20 of the plunger will extend in the path of the cross head. It should be noted at this point that the indicator is so positioned that the cross head will not reciprocate completely past its plunger as otherwise the plunger would be broken upon return movement of the cross head. It will be clear that when so mounted, each reciprocation of the cross head will cause reciprocation of the plunger 17 and consequent turning of the ratchet wheel 32 and indicating needle 44. It will be equally clear that exactly the same result will be attained by placing the indicator at any point where its plunger will be exposed to the action of a uniformly reciprocating part of the engine. The operation of the indicator may be stopped at any time by swinging the locking cam 37 to the reverse of the position shown in Fig. 3 by means of which the plunger will be so elevated that its cam head 32 will not be engaged by the cross head of the engine.

The dial plate 43, previously referred to, is inscribed with a plurality of circles concentrically arranged about the shaft 31 to provide a plurality of concentric annular scales, each scale in turn being divided into a plurality of scale divisions, there being as many divisions in each scale as there are teeth in the ratchet wheel 32. It will therefore be clear that the indicating needle 44 will, at all times, point to one or the other of the divisions of each scale. In the present instance five concentric scales A, B, C, D and E are illustrated, each having fifty-one scale divisions, the numbers upon the inner scale running from zero to fifty and those on scale B from zero to three hundred, the number in each of the scale divisions of the scale B being six times the number in the corresponding scale division of the inner scale A. As the scales A and B are for a different purpose from the scales C, D and E, the operation and use of the former scales will be explained at this point.

The dial plate, illustrated in Fig. 4 is intended to be employed upon an indicator which is to be thrown into operation for periods of ten seconds, that is, the locking cam 37 is released for a period of ten seconds and then again swung to locked position. I will assume that, under such circumstances, the indicator needle is removed from its normal position at the zero of the scales A and B to the position shown in Fig. 4 of the drawings. It will be clear that, under these circumstances, the cross head of the engine is reciprocated twenty-five times during ten seconds as clearly indicated by scale A. The scale B illustrates the number of reciprocations of the cross head per minute as will be readily understood from a comparison of the figures inscribed upon the two scales A and B. After a speed reading has been taken in this manner, the indicator needle may be returned to normal position by again releasing the locking cam 37 or merely by manually turning the needle in a clockwise direction until it reaches the zero divisions of the scales A and B. At this point it should be noted that the drive pulley 50 of the engine will revolve once for each reciprocation of the cross head 46 and that the scales A and B therefore indicate the number of revolutions of this pulley. Assuming that the diameter of this drive pulley 50 is thirty-six inches and that the diameter of the pump pulley 52 is twelve inches, it will be clear that when the pump is driven by the belt 51, the pulley 52 will be revolved three times for each revolution of the pulley 50. In like manner, if the diameter of the pulley 52 were 9 inches, it would be revolved four times for each revolution of the pulley 50 and if its diameter was six inches it would be revolved six times for each revolution of the pulley 50. For this reason I provide the scales C, D and E which indicate the number of revolutions of twelve, nine and six inch pulleys per minute when driven by a thirty-six inch drive pulley, the speed of which is indicated by the scale B. With such an arrangement of scales, it will be clear that the indicator will not only indicate the speed at which the engine is operating but also the speed at which a pump, threshing machine or other machine is being driven by the engine.
As most pulleys in common use are either twelve, nine or six inch pulleys, the above dial having the five scales inscribed will be sufficient. However, additional dials having scales for various sized drive pulleys and driven pulleys and, if desirable, scales for twenty or thirty seconds, instead of ten seconds, may be supplied with each indicator in order to permit of practically universal use of the indicator. Furthermore, if certain parts of the engine or of the machine to which the indicator is attached are driven at different speed ratios to the part with which the indicator engages, similar dials having scales disclosing these different ratios may be employed and the indicator therefore employed to indicate directly the speeds at which the various parts of the machine are moving.

From the foregoing description it will be apparent that I have provided an extremely simple, efficient and convenient form of speed indicator and one capable of a vast range of use. It will be understood however, that I do not wish to be limited to the specific details illustrated and described as various changes, within the scope of the appended claims, may be made at any time desired without in the slightest degree departing from the spirit of my invention.
The indicator casing will of course be provided with a transparent face plate of glass to protect the dial from dust and at the same time permit reading of the needle positions.
Having thus described the invention, what is claimed as new is:

1. A speed indicator including a body adapted for attachment to a machine, a plunger mounted for reciprocation in the body, said plunger having cam heads at each end, one of which projects beyond the body to be engaged by a reciprocating part of the machine to reciprocate the plunger, a ratchet wheel, the rotation of which controls movement of an indicator needle, means operable by reciprocation of the plunger for turning the ratchet wheel, means holding the plunger against turning movement, and means for normally holding the plunger in position to be engaged by the reciprocating part of the machine.

2. A speed indicator including a tubular body adapted for application in the path of a moving machine part, a bearing head detachably connected to one end of the body, a casing supported by and partially inclosing the head, an indicator mechanism supported in the casing, and co-acting plungers reciprocally supported in guideways formed in the head for operative engagement with each other, one of the plungers extending from the opposite end of the body member and the other operatively engaging the indicator mechanism.

In testimony whereof I affix my signature in presence of two witnesses.

JOHN STROBLE. [L. S.]

Witnesses:
WILLIAM H. BUSCHMAN,
WILLIAM P. BELGER.